United States Patent [19]

Iwamura et al.

[11] 4,228,430

[45] Oct. 14, 1980

[54] CRT DISPLAY APPARATUS WITH CHANGEABLE CURSOR INDICIA

[75] Inventors: Masahiro Iwamura; Nagaharu Hamada, both of Hitachi; Schigeo Kuboki, Nakaminato; Kenichi Fukushima, Kodaira, all of Japan

[73] Assignee: Hitachi, Ltd., Japan

[21] Appl. No.: 860,117

[22] Filed: Dec. 13, 1977

[30] Foreign Application Priority Data

Dec. 17, 1976 [JP] Japan ............................ 51-150859

[51] Int. Cl.[3] ........................................ G06F 3/14

[52] U.S. Cl. ............................ 340/709; 340/735; 340/723; 340/750; 340/799

[58] Field of Search ........... 340/324 AD, 324 A, 335, 340/340, 709, 723, 750, 791, 799, 814, 735, 790

[56] References Cited

U.S. PATENT DOCUMENTS

| | | | |
|---|---|---|---|
| 3,531,796 | 9/1970 | Kiesling | 340/324 AD |
| 3,573,855 | 4/1971 | Gragon et al. | |
| 3,911,419 | 10/1975 | Bates et al. | 340/735 |
| 3,967,266 | 6/1976 | Roy | 340/324 AD |
| 3,997,891 | 12/1976 | Iwamura et al. | 340/324 AD |
| 4,093,995 | 6/1978 | Smith et al. | 364/900 |

OTHER PUBLICATIONS

*Correlation of Coded Graphic Representations with Cursor Position*; Bantz et al., IBM Tech. Discl. Bull., vol. 20, No. 2, pp. 806-807, Jul. 1977.

*Primary Examiner*—Marshall M. Curtis
*Attorney, Agent, or Firm*—Craig & Antonelli

[57] ABSTRACT

Disclosed is a raster scanning type CRT display apparatus having a microprogrammed processor for primarily controlling the input and output of data to and from an external information source. This CRT display apparatus comprises a plurality of cursor controlling registers having their contents set by the processor. The contents of these registers define the configuration of a cursor for displaying a data entry position on its screen, the decision with respect to the blinking of the cursor, and a period of the blinking.

2 Claims, 8 Drawing Figures

CRT DISPLAY APPARATUS WITH CHANGEABLE CURSOR INDICIA

BACKGROUND OF THE INVENTION

The present invention relates to a CRT (cathode-ray tube) display apparatus, and more particularly to a cursor display in a character display apparatus of a raster scanning type.

A character display apparatus with a CRT display has been widely used as a man-machine communication device in a computer system. When, for example, it is desired to enter new data into the computer or to edit or correct data which has already been entered therein, an operator operates such a display apparatus so that required data may appear on its screen, and replaces or changes the data with new data one by one with the aid of a keyboard or the like by viewing the screen. The display apparatus used for such applications requires a cursor display for indicating on the screen a position of data to be inserted or altered.

A typical CRT display apparatus includes a refresh memory for storing data to be displayed which corresponds to a frame of image. The input and output of data between the refresh memory and external information sources such as the computer, keyboard or the like are controlled by an input/output control part. A timing control part provides the generation of display addresses for sequentially reading the contents of the refresh memory for the purpose of display, and provides various timing controls for display. The display of a cursor is effected by controlling a video signal at a timing at which the display address produced by the timing control part coincides with a data entry position selected by the input/output control part. The cursor display causes the character to be provided with an under-line or a block indication there-around. The cursor display may be blinked to make the cursor striking to the viewer, as disclosed in U.S. Pat. No. 3,531,796. The display apparatus used defines the number of characters which can be displayed, the size of them, the spacings of the characters on lines, etc., and these conditions determine the use of one of the various cursor displays as mentioned above.

Recently, microprogramming controls in each part of the display apparatus have been put into practice. This makes it possible to provide a display apparatus whose capacity of display characters or whose display functions can be made different by the alteration of the program with the same timing control part used. In this case, the cursor display is often required to be unique corresponding to the individual display apparatus to be used. The use of many cursor display circuits in conformance with the respective requirements, however, results in a loss of the merit of the microprogramming control which allows the reduction of hardwares and the production of high cost performance with the hardware made common to many devices.

SUMMARY OF THE INVENTION

An object of the present invention is to provide a CRT display apparatus capable of effecting a cursor display suitable for microprogramming controls, and more particularly, to provide a CRT display apparatus which allows various kinds of cursor displays with hardwares reduced in number and made common.

According to one aspect of the present invention, a plurality of registers having their contents settable by a program are provided to effect any cursor display. More specifically, these registers control a cursor coincidence signal in such a manner that it controls a video signal only at a timing when a cursor is to be displayed. These registers contains a cursor start address for indicating an upper limit of a cursor to be displayed and a cursor end address for indicating a lower limit thereof. The registers can be set for display according to the shape of the cursor, the decision with respect to the blinking of the cursor and its blinking period.

DETAILED DESCRIPTION OF THE PREFERRED EMBODIMENTS

Figure 1:
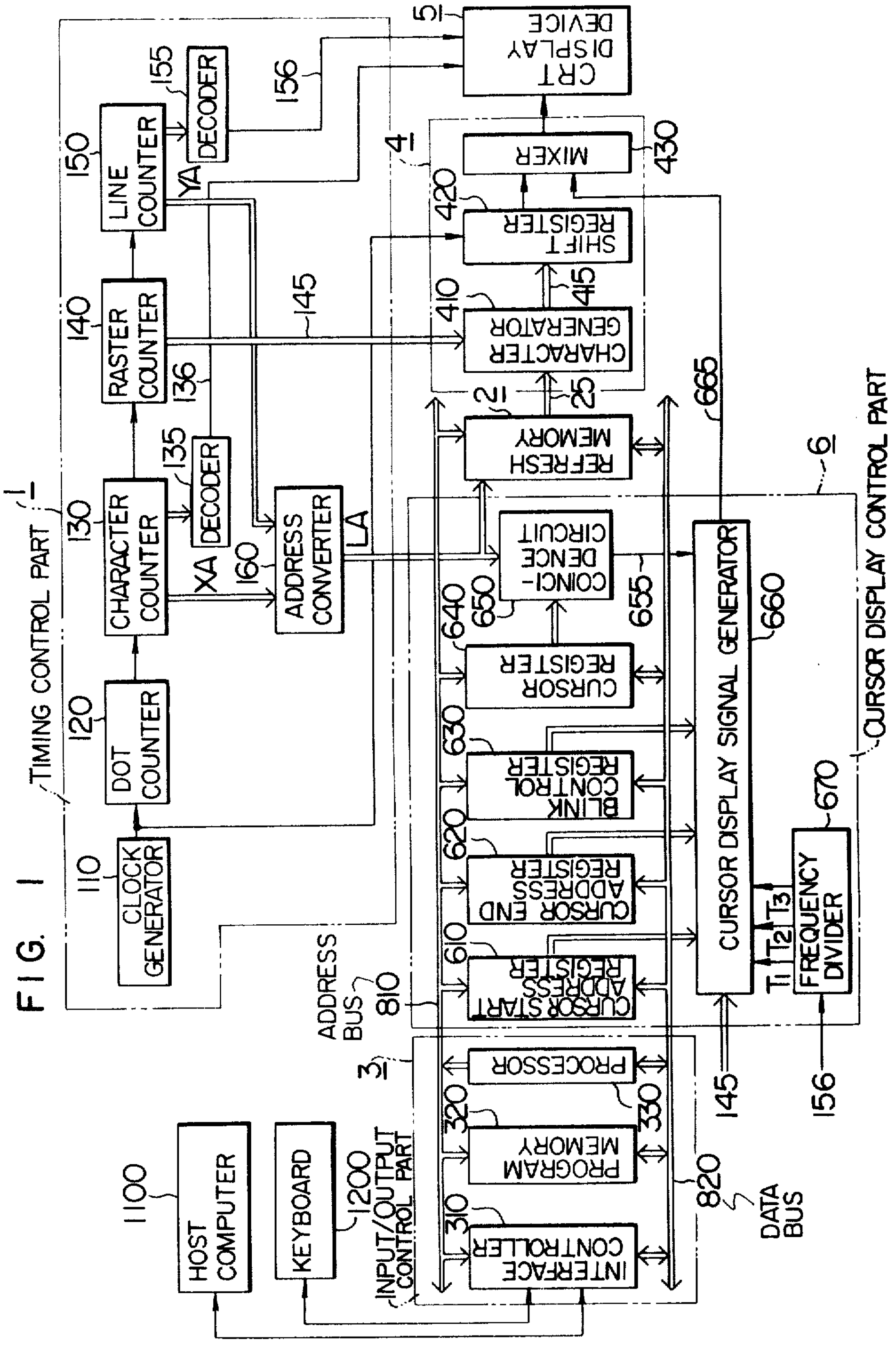
FIG. 1 is a block diagram showing the whole arrangement of a CRT display apparatus according to one embodiment of the present invention.

FIG. 1 is a block diagram showing a whole arrangement of a raster scanning type CRT display apparatus according to one embodiment of the present invention. The whole system comprises a timing control part 1, a refresh memory 2 for storing character data corresponding to one frame of image, an input/output control part 3 for controlling the input and output of data to and from external information sources, a video control part 4 for converting display data read from the refresh memory 2 to a video signal, a CRT display device 5 for converting the video signal to a visible image, and a cursor control part 6, a main portion, for generating a cursor display signal.

The timing control part 1 will first be described. A clock generator 110 generates a reference timing for the display apparatus. A dot counter 120 counts up dots at a timing corresponding to a display for each dot on one frame of image, and has the maximum count number which restricts the number of horizontal dots in a one-character block. A character counter counts up characters at a timing at which a raster for scanning the displayed frame of image goes across the one-character block, and has the maximum count number which restricts the number of horizontal characters on the frame of image. A decoder 135 produces a horizontal synchronizing signal 136 for application to the CRT display device 5. A raster counter 140 counts the number of the raster passing through the respective character block to generate a raster address 145, and has the maximum count number which restricts the number of vertical dots in the one-character block. A line counter 150 determines on what line the frame scanning raster scans the character block, and has the maximum count number which restricts the number of vertical characters of one frame. A decoder 155 produces a vertical synchronizing signal 156 from the line counter 150 for application to the CRT display 5.

The refresh memory 2 for storing the display data corresponding to one frame of image in the form of coded data is driven by a display address LA produced from an address converter 160 and produces display data 25 in sequence.

The video control part will next be described. A character generator 410 receives as an input the coded data 25 and the raster address 145 produced from the raster counter 140, and produces a dot pattern signal 415 for each raster address of an addressed character. The dot pattern signal 415 is parallel-to-series converted by a shift register 420, and applied to the display device 5 in the form of a video signal through a mixer 430. The mixer 430 has the other input which receives a cursor display signal 665 from a cursor display signal generator 660 to provide a cursor display on a certain character location on the screen of the CRT display device 5.

The description will now be made about the address converter 160. A count address output XA from the character counter 130 indicates an X-coordinate of the character block to be displayed, while a count address output YA from the line counter 150 indicates a Y-coordinate thereof. The address converter 160 serves to convert a two-dimensional address of XA and YA into a one-dimensional display address LA in accordance with the following expression:

$$LA = M \cdot YA + XA$$

where M is the number of display characters on one line.

Figure 2:
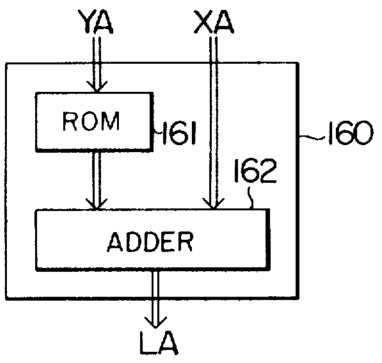
FIG. 2 is a block diagram showing an address converter in FIG. 1 more fully.

FIG. 2 shows a typical example of the address converter, having a ROM (Read Only Memory) 161 and an adder 162. The ROM 161 stores values of M·YA corresponding to those of YA as shown in Table I, in which M=80.

TABLE I

| YA | M YA |
|---|---|
| 0 | 0 |
| 1 | 80 |
| 2 | 160 |
| . | . |
| . | . |
| . | . |
| . | . |
| 23 | 1,840 |
| 24 | 1,920 |

The output from the ROM 161 is added to the output XA from the character counter in the adder 162 for conversion from the two-to one-dimensional address.

Referring back to FIG. 1 to describe the input/output control part, it comprises a microprocessor 330, a program memory 320 including ROM and RAM (Random Access Memory), and an interface controller 310 for controlling the input and output of information to and from a host computer 1100 or keyboard 1200. Thus, the CRT display apparatus as shown in FIG. 1 executes the input and output controls of information to and from the host computer and input/output devices, and other internal control operations under programmed control of the microprocessor 330.

The description will next be made with respect to the cursor display control part 6, which includes a cursor register 640 for setting a cursor display location on the display frame. The cursor display location can usually be changed with the aid of a cursor control key (not shown) on the keyboard 1200. In other words, the depression of the cursor control key allows data of the depressed key to be read into the microprocessor 330 through the interface controller 310. To know the current cursor display location, the microprocessor 330 addresses the cursor register 640 through an address bus 810 and reads cursor data through a data bus 820. The calculation is made to alter the cursor address in accordance with the content of the previously read key data with the altered data written into the cursor register 640.

The above-mentioned processing provides the alteration of the cursor location. The cursor register 640 cooperates with a coincidence circuit 650 to provide a cursor coincidence detector for generating a cursor coincidence signal 655. In other words, the coincidence circuit has one input which receives the display address LA produced from the address converter 160. An output 655 produced when the display address LA coincides with the contents of the cursor register 640 corresponds to a period during which the raster scans across the character block at the cursor location on the screen of the display device 5. The application of the cursor coincidence signal 655 to the mixer 143 without any change causes the whole character block at the cursor location to be lit to provide a block-like cursor display. The present embodiment, on the other hand, makes various cursor displays possible because the video signal for the cursor display is derived from an output of the cursor display signal generator 660 as described below.

As shown in FIG. 1, a cursor start address register 610, a cursor end address register 620 and a blink control register 630 are all connected to the microprocessor 330 through the address bus 810 and data bus 820, and thus programmable by the microprocessor 330.

Figure 3:
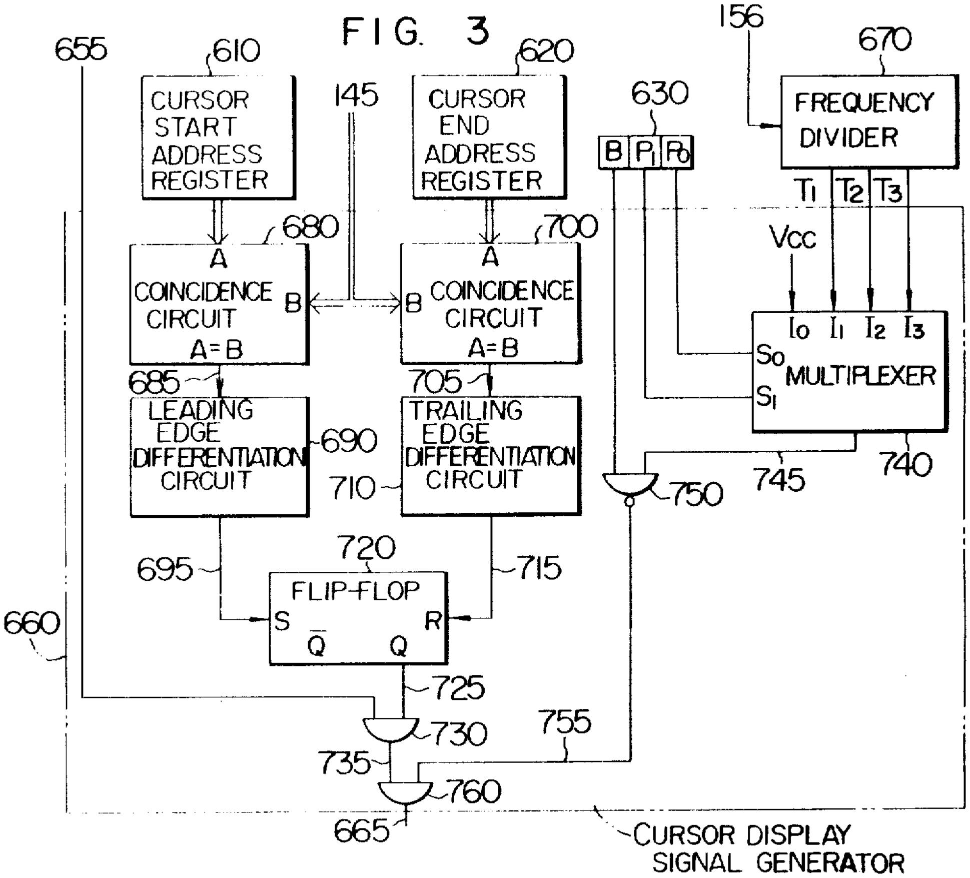
FIG. 3 is a block diagram showing a cursor display signal generator in FIG. 1 more fully.
Figure 4:
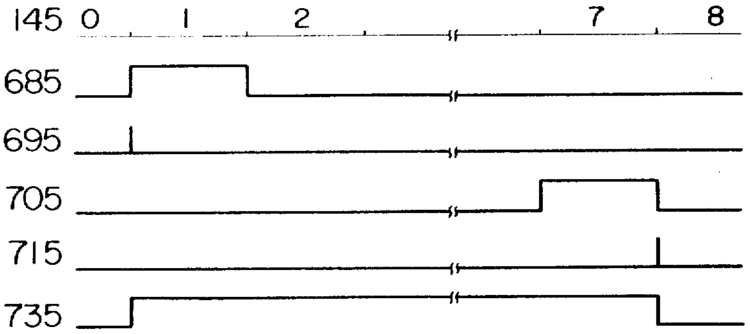
FIG. 4 shows wave forms for illustrating an operation at each portion in FIG. 3.

Referring next to FIG. 3, the cursor display signal generator 660 with its associated circuits will be described. In FIG. 3, a coincidence circuit 680 compares an output from the cursor start address register 610 with the raster address 145 and produces an output signal 685 at a period during which both coincide with each other. A leading edge differentiation circuit 690 produces an output pulse at the leading edge of the signal 685. A coincidence circuit 700 also compares an output from the cursor end address register 620 with the raster address 145 and produces an output signal 705 at a period during which both coincide with each other. A trailing edge differentiation circuit 710 produces a pulse signal 715 at the trailing edge of the coincidence signal 705. A flip-flop 720 is set in response to the output signal 695 from the leading edge differentiation circuit and reset in response to the output signal 715 from the trailing edge differentiation circuit 710 with its Q-output regulating the vertical position or height of the cursor. FIG. 4 is timing charts for illustrating the operations of the above-mentioned circuits, in which the cursor start address register is programmed with the address 1 and the cursor end address register with the address 7.

An output 725 from the flip-flop 720 is applied to an AND gate 730 together with a cursor coincidence signal 655 produced from the coincidence circuit 650 in FIG. 1. If an output 735 from the AND gate 730 is applied as a cursor displaying video signal to the mixer 430 in FIG. 1, then the cursor display has its shape changed depending upon values set in the cursor start address register 610 and the cursor end address register 620. This can conform to requirements of many kinds of display apparatus. In the embodiment of FIGS. 1 and 3, the blink control register 630 is further provided to make it possible to blink the cursor display or to change even the period of the blinking in dependence upon the value set thereto.

Referring back again to FIG. 3, a frequency divider 670 further divides the vertical synchronizing signal 156 described in FIG. 1 to produce three kinds of on-off signals $T_1$, $T_2$, $T_3$ each having a different period. The period is selected in the range of 100 msec to 1 sec in accordance with its application.

The blink control register 630 is a three-bit register with bits $P_o$, $P_1$ selecting the blinking period of the cursor and a bit B selecting whether it should be blinked or not. A multiplexer 740 selects one signal from a constant signal Vcc and the on-off signals $T_1$, $T_2$, $T_3$ with the different period in accordance with the contents of $P_o$, $P_1$, and produces it. An output 745 from the multiplexer 740 is applied to an AND gate 760 through a NAND gate 750 together with the output 735 from the AND gate 730, and an output 665 from the AND gate 760 is applied as the cursor displaying video signal to the mixer in FIG. 1. If, for example, the bit B is set to "1", and the bits $P_o$, $P_1$ to "0", "1"; "1", "0"; "1", "1", then the blink control signal 755 produced from the NAND gate 750 goes on or off at a period of any one of the on-off signals $T_1$, $T_2$, $T_3$ selected by the multiplexer 740. Thus, the cursor display signal 655 is influenced by this on-off operation with the cursor display blinked at the selected period. If, on the other hand, the bit B is set to "1" and both the bits $P_o$, $P_1$ to "0", then the blink control signal 755 is always at "0" with the cursor display inhibited. The setting of the bit B to "0" causes the blink control signal 755 to be always "1" with no blinking of the cursor.

While the description of the blink control has been made by way of the embodiment in which the three-bit blink control register is used, a two-bit blink control register may also be used to provide the blinking and two kinds of blinking periods with sufficient effects achieved.

In the above embodiment, the setting of the registers 610, 620, 630, etc. is performed by the microprocessor 330, and may usually be done by actuating an initial loading routine when the system is set up. More specifically, the registers such as the registers 310, 320, 330 which require the loading are all connected to the address bus 810 and provided with proper addresses, respectively. The particular address of the controlling memory is assigned to an initial data table for storing data which is to be written into the registers requiring the initial loading. The connection of the power supply for the CRT display apparatus causes the actuation of the initial loading routine and the successive transfer of contents of the initial date table to these registers through the data bus. This operation is repeated until the initial data are transferred to all the registers.

Figure 5A:
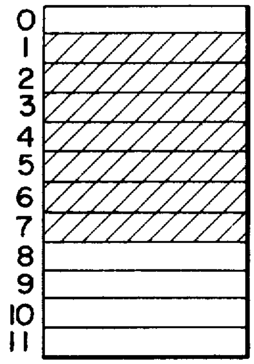
FIGS. 5*a* to 5*d* are conceptional views showing an example of a cursor display on the CRT display apparatus in FIG. 1.

FIGS. 5*a* to 5*d* show examples of the cursor display according to the present invention with a display apparatus in which the one-character block is displayed with twelve rasters of raster addresses 0 to 11. The characters are actually displayed in the one-character block in the range of seven rasters having the raster addresses. FIG. 5*a* shows a block-like cursor start address set to 1 and the cursor end address to 7.

Figure 5B:
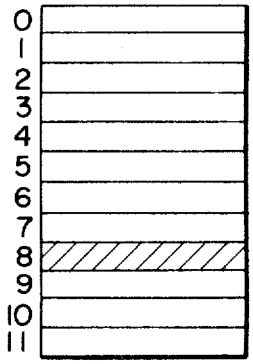
Figure 5C:
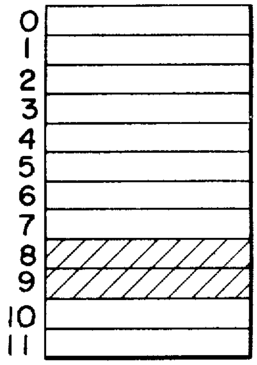
Figure 5D:
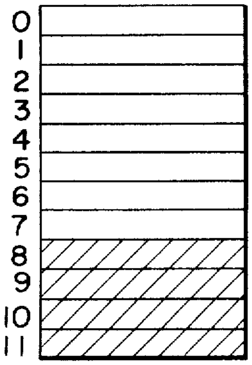

FIGS. 5*b*, 5*c* and 5*d* respectively show cursors by an underline display with both the start address and end address set to 8 in FIG. 5*b*, the start address to 8 and the end address to 9 in FIG. 5*c*, and the start address to 8 and the end address to 11 in FIG. 5*d*.

As mentioned above, the CRT display apparatus as shown in FIGS. 1 to 5 can be programmed to set the cursor display in shape or to provide the decision with respect to the blinking of the cursor and determine its blinking period. It is particularly advantageous that the timing control part 1 except for the clock generator 10 and the cursor display control unit 6 are integrated circuits. These parts are all digital circuits and can be integrated in one chip of LSI. The LSI is widely applicable as a control circuit for various kinds of CRT display apparatus with different cursor display modes for great improvement in cost performance of the CRT display.

We claim:

1. A CRT display apparatus comprising:
a refresh memory for storing display data for one frame of an image in the form of coded data;
input/output control means coupled to the refresh memory for controlling the input and output of information to and from said refresh memory;
video control means coupled to the refresh memory for converting the display data read from said refresh memory into a video signal;
a CRT display device coupled to the video control means for converting said video signal into a visible image;
timing control means coupled to the refresh memory, the video control means and the CRT display device for generating a plurality of synchronizing signals for a raster scanning of said CRT display device and for generating a display address for reading said refresh memory corresponding to said raster scanning; and
cursor display control means coupled to the timing control means, the video control means, and the input/output means for generating a cursor display signal,
wherein said cursor display control means comprises:
a cursor start address register coupled to said input/output control means for producing a programmed cursor start address;
a cursor end address register coupled to said input/output control means for producing a programmed cursor end address;
a cursor register coupled to said input/output control means for generating a cursor display address;
a cursor coincidence detector coupled to said timing control means and said cursor register for producing a cursor coincidence signal representative of coincidence of said display address with said cursor display address;
a first coincidence detector coupled to said cursor start address register and said timing control means for producing a first signal pulse representative of coincidence of said programmed cursor start address and said display address;
a second coincidence detector coupled to said cursor end address register and said timing control means for producing a second signal pulse representative of coincidence of said programmed cursor end address and said display address;
a first differentiating circuit coupled to said first coincidence detector for producing a third signal pulse representative of a leading edge of said first signal pulse;
a second differentiating circuit coupled to said second coincidence detector for producing a fourth signal pulse representative of a trailing edge of said second signal pulse;

a flip-flop set by said third signal pulse and reset by said fourth signal pulse for producing the cursor display signal; and a gate for passing said cursor display signal to said video control means only at a period during which said cursor coincidence detector produces the cursor coincidence signal.

2. A CRT display apparatus according to claim 1, wherein said cursor display control means further comprises a blink control register having at least a first bit settable for determining the blinking of a cursor and a second bit settable for selecting a period of the blinking, means for generating a plurality of on-off signals each having a different period, a multiplexer for selecting one of said on-off signals each having a different period in accordance with the content of said second bit, and a gate circuit for controlling the passage of said cursor display signal in accordance with said first bit and the output of said multiplexer.

* * * * *